United States Patent
Ling et al.

(10) Patent No.: US 8,929,390 B2
(45) Date of Patent: Jan. 6, 2015

(54) METHODS AND APPARATUSES FOR CHANNEL ESTIMATION IN WIRELESS NETWORKS

(71) Applicant: Alcatel-Lucent USA Inc., Murray Hill, NJ (US)

(72) Inventors: Jonathan Ling, North Brunswick, NJ (US); Dmitry Chizhik, Highland Park, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 124 days.

(21) Appl. No.: 13/625,197

(22) Filed: Sep. 24, 2012

(65) Prior Publication Data

US 2014/0086232 A1  Mar. 27, 2014

(51) Int. Cl.
*H04J 3/16* (2006.01)
(52) U.S. Cl.
USPC ............................ 370/465; 370/254; 370/255
(58) Field of Classification Search
None
See application file for complete search history.

(56) References Cited

U.S. PATENT DOCUMENTS

| | | | |
|---|---|---|---|
| 6,907,270 B1 * | 6/2005 | Blanz | 455/562.1 |
| 2008/0130674 A1 * | 6/2008 | Ahmed-Ouameur et al. | 370/441 |
| 2010/0074358 A1 | 3/2010 | Khojastepour et al. | |
| 2011/0090394 A1 | 4/2011 | Tian et al. | |
| 2014/0086232 A1 * | 3/2014 | Ling et al. | 370/346 |

OTHER PUBLICATIONS

International Search Report and Written Opinion issued in International Patent Application No. PCT/US2013/060382, dated Nov. 19, 2013.
Xie, et al., "Robust Threshold Compressed Sensing Based Sparse Multipath Channel Estimation in OFDM System", Information, Communication and Signal Processing, Dec. 13, 2011, pp. 1-5.
Wang, et al., "A Novel Sparse Channel Estimation Method for Multipath MIMO-OFDM Systems", Vehicular Technology Conference, Sep. 5, 2011, pp. 1-5.
Renwang, et al., "Study on Sparse Channel Estimation Algorithm Based on Compressive Sensing for OFDM Systems", Communication Software and Networks, May 27, 2011, pp. 368-371.
Taubock, et al., "A Compressed Sensing Technique for OFDM Cannel Estimation in Mobile Environments: Exploiting Channel Sparsity for Reducing Pilots", Acoustics, Speech and Signal Processing, Mar. 31, 2008, pp. 2885-2888.
Tropp, Joel A. et al. "Signal Recovery From Random Measurements Via Orthogonal Matching Pursuit" IEEE Transactions on Information Theory, vol. 53, No. 12, Dec. 2007, pp. 1-12.

* cited by examiner

*Primary Examiner* — Robert Wilson
(74) *Attorney, Agent, or Firm* — Harness, Dickey & Pierce

(57) ABSTRACT

In a method for estimating a channel at a receiver in a wireless communications network, the receiver obtains channel model parameters for a received signal based on raw channel estimates for the received signal, where each raw channel estimate corresponds to an antenna at the receiver. The receiver combines, for each of a plurality of contiguous subcarriers in the wireless communications network, the channel model parameters to generate a first plurality of combined channel model parameters. The receiver then chooses a first set of indices corresponding to combined channel model parameters from among the first plurality of combined channel model parameters having magnitudes passing a combined channel model parameter threshold. The receiver then estimates the channel in a sparse domain based on the first set of indices.

16 Claims, 2 Drawing Sheets

METHODS AND APPARATUSES FOR CHANNEL ESTIMATION IN WIRELESS NETWORKS

BACKGROUND

For wireless transmission, pilots or pilot signals are used to identify a channel for each transmit antenna to the receive antennas. The channel is then used in demodulating data symbols. In $3^{rd}$ Generation Partnership Project (3GPP) long-term evolution (LTE) networks, pilot overhead is approximately 5% per antenna, about 16% for 4 antennas, and even higher for 8 or more antennas. In these types of networks, multiple transmit antennas can be used for diversity to improve received signal power or to send multiple spatial streams, all of which increase transmission throughput. As the number of antennas grows so does the potential for further throughput improvement; however, the overhead due to pilots also grows.

Compressed sensing may reduce pilot overhead and enable cellular systems to increase the number of antennas or improve the effectiveness for a fixed number of antennas. Compressed sensing relies on the assumption that channels can be represented compactly in some basis. Consequently, fewer samples are required to identify the channel relative to traditional methods, such as Nyquist sampling, which requires a sampling rate that is at least twice the highest frequency component of the signal. For example, in contrast to traditional Nyquist sampling, the number of samples needed for compressed sensing is ideally proportional to the amount of information in the signal. Thus, with compressed sensing, the number of samples increases as the amount of information in the signal increases. Consequently, signals having relatively large amounts of information may require a relatively large number of samples to accurately obtain the transmitted data at the receiver.

SUMMARY

At least one example embodiment provides a method for estimating a channel at a receiver in a wireless communications network. According to at least this example embodiment, the method includes: obtaining, at the receiver, channel model parameters for a received signal, based on raw channel estimates for the received signal, each raw channel estimate corresponding to an antenna at the receiver; combining the channel model parameters to generate a first plurality of combined channel model parameters; choosing a first set of indices corresponding to combined channel model parameters from among the first plurality of combined channel model parameters having magnitudes passing a combined channel model parameter threshold; and estimating the channel in a sparse domain based on the first set of indices.

According to at least one other example embodiment, a method for estimating a channel at a receiver in a wireless communications network includes: obtaining, at the receiver, channel model parameters for a received signal based on raw channel estimates for the received signal, each raw channel estimate corresponding to an antenna at the receiver; combining the channel model parameters to generate a first plurality of combined channel model parameters; choosing a first set of combined channel model parameters from among the first plurality of combined channel model parameters based on magnitudes of the first plurality of combined channel model parameters and a combined channel model parameter threshold; and estimating the channel in a sparse domain based on indices corresponding to the combined channel model parameters in the first set of combined channel model parameters.

At least one other example embodiment provides a receiver including a receiver processing module and a channel estimation processing module. According to at least this example embodiment, the receiver processing module is configured to obtain channel model parameters for a received signal based on raw channel estimates for the received signal, each raw channel estimate corresponding to an antenna at the receiver. The channel estimation module is configured to: combine the channel model parameters to generate a first plurality of combined channel model parameters; choose a first set of indices corresponding to combined channel model parameters from among the first plurality of combined channel model parameters having magnitudes passing a combined channel model parameter threshold; and estimate the channel in a sparse domain based on the first set of indices.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
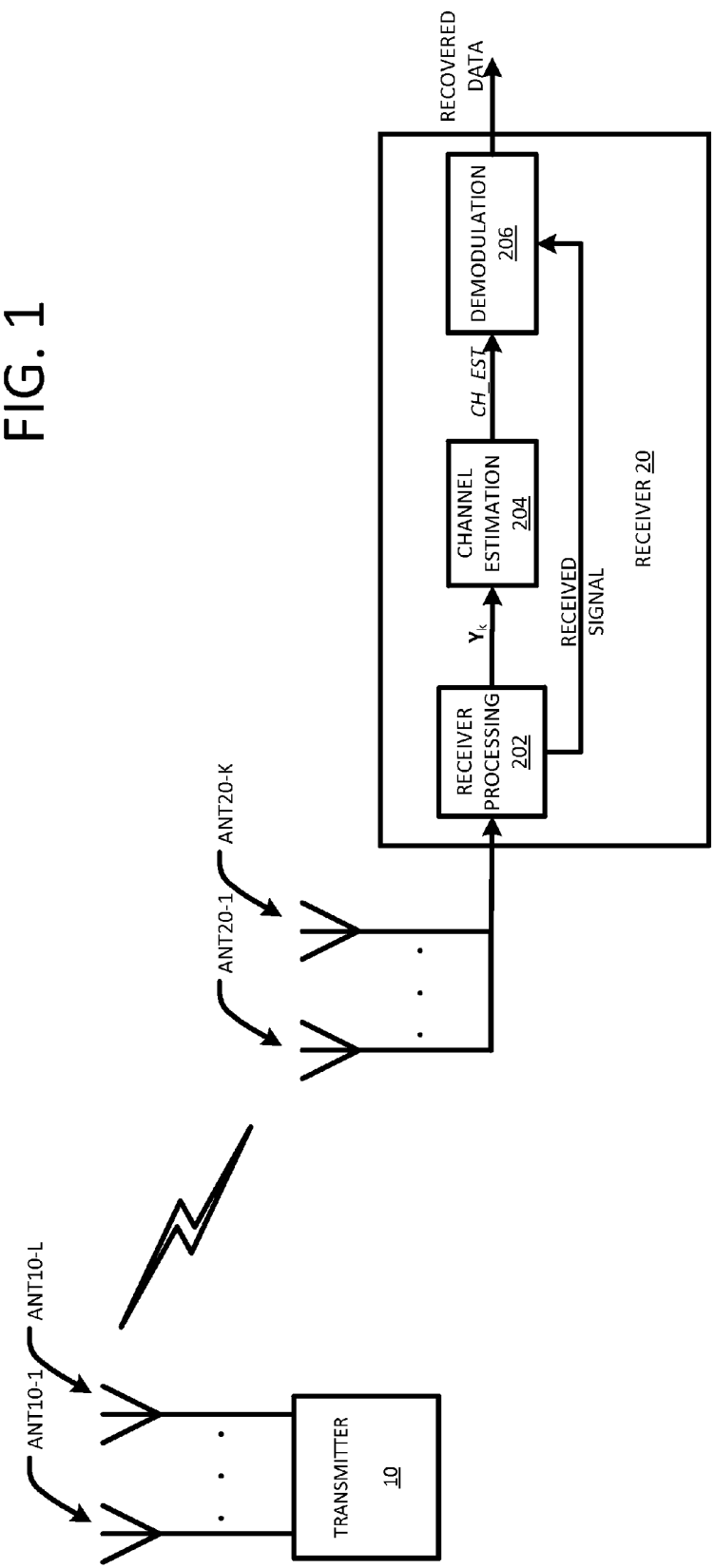
FIG. 1 shows a simple network diagram including a transmitter and receiver according to an example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF EMBODIMENTS

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "buffer" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

For example purposes, example embodiments will be described with regard to a single set of d contiguous orthogonal frequency division multiplexed (OFDM) subcarriers, with N pilots (or reference symbols) from each source (e.g., antenna) in the frequency domain.

FIG. 1 is a simple network diagram including a transmitter 10 and a receiver 20 according to an example embodiment.

Referring to FIG. 1, the transmitter 10 and the receiver 20 are configured to communicate with one another over a wireless link. The transmitter 10 includes a plurality of transmit antennas ANT10-1 through ANT10-L. In addition, the transmitter 10 includes conventional transmission components capable of transmitting signals to the receiver 20 over a wireless link. Although discussed herein as transmitter 10 and receiver 20, it should be understood that each of the transmitter 10 and receiver 20 may be a transceiver capable of transmitting and receiving wireless as well as other signals. Moreover, each of the transmitter 10 and the receiver 20 may be a mobile or base station.

As used herein, the term "mobile" describes a remote user of wireless resources in a wireless communication network. The term "mobile" may be considered synonymous to, and may hereafter be occasionally referred to, as a client, mobile unit, mobile station, mobile user, user equipment (UE), subscriber, user, remote station, access terminal, receiver, etc.

Similarly, as used herein, the term "base station" describes a transceiver in communication with and providing wireless resources to mobiles in a wireless communication network. The term "base station" may be considered synonymous to, and may hereafter be occasionally referred to, as a Node B, base transceiver station (BTS), e-Node B, etc. As discussed herein, base stations may have all functionally associated with conventional, well-known base stations in addition to the capability to perform the methods discussed herein.

The receiver 20 includes a plurality of receive antennas ANT20-1 through ANT20-K. In addition, as shown in FIG. 1, the receiver 20 includes a receiver processing block 202, a channel estimation block 204, and a demodulation block 206, each of which will be described in more detail later. As discussed herein, the receiver processing block 202 may be referred to as a receiver processing module 202, the channel estimation block 204 may be referred to as the channel estimation module 204, and the demodulation block 206 may be referred to as a demodulation module 206.

Still referring to FIG. 1, pilots (or reference symbols) transmitted by the transmitter 10 are used to identify channel matrix for channels between the transmitter antennas ANT10-1 through ANT10-L at the transmitter 10 and the receive antennas ANT20-1 through ANT20-K at the receiver 20. As is known, pilot symbols are represented on the diagonal of an N×N matrix, $\Lambda_p(l)$, where N represents the number of pilots from each antenna. For the sake of this discussion, the pilot symbols are considered 1's without loss of generality. The remainder of the text will focus on the channel between one transmit antenna (particular index l) to a multitude of receive antennas, and so we will drop the transmit antenna index l.

In one example, the measurement matrix H is given by Equation (1) shown below. In this case, N represents the number of pilots from each antenna.

$$H = \begin{bmatrix} h_{11} & \cdots & h_{1d} \\ \vdots & \ddots & \vdots \\ h_{N1} & \cdots & h_{Nd} \end{bmatrix} \quad (1)$$

The transmitted pilots propagate through a channel and are received as a signal $y_p(k)$ at each of the K receive antennas ANT20-1 through ANT20-K. In this regard, the received signal $y_p(k)$ at the k-th receive antenna is represented by a signal matrix and given by Equation (2) shown below. In this case, k is an index having a value between 1 and K, where K corresponds to $N_a$; that is, the number of receive antennas at the receiver 20.

$$y_p(k) = \Lambda_p H \theta(k) + w(k) \quad (2)$$

In Equation (2), w is a N×1 vector of additive white Gaussian measurement noise, and H is the identified measurement matrix discussed above. In this example, the measurement matrix H is an N×d discrete Fourier transform (DFT) matrix. Measurement matrices such as these are well-known, and thus, a detailed discussion is omitted. As mentioned above, d is the number of subcarriers in the system (e.g., the orthogonal frequency division multiplexed (OFDM) system), and N represents the number of pilots from each antenna, each on a separate subcarrier. Still referring to Equation (2), $\theta(k)$ represents a channel model, which is a d×1 vector of channel model coefficients (also referred to herein as channel model parameters).

Because the transmitted pilots $\Lambda_p$ are known at the receiver 20, raw channel estimates y(k) for the k-th receive antenna among the K receive antennas ANT20-1 through ANT20-K are obtained by dividing the received signal $y_p(k)$ at the k-th receive antenna by the known transmitted pilot $\Lambda_p$, as shown below in Equation (3).

$$y(k) = \frac{y_p(k)}{\Lambda_p} = \frac{\Lambda_p H \theta(k) + w(k)}{\Lambda_p} = H\theta(k) + \frac{w(k)}{\Lambda_p} \quad (3)$$

In order to recover transmitted data, the receiver 20 generates an estimate of the channel model $\theta(k)$ based on the raw channel estimates y(k) for the K receive antennas ANT20-1 through ANT20-K. As mentioned above, the channel model $\theta(k)$ is a d×1 vector of channel model coefficients (also referred to herein as channel model parameters). Once the channel model $\theta(k)$ is estimated, channels or channel estimates at other frequencies (or subcarriers) containing useful data (or information) may be predicted and/or estimated using the estimated channel model $\theta(k)$.

Compressed sensing relies on the assumption that channels can be represented compactly in an alternative basis. In the compressed sensing framework discussed herein, the basis is the discrete Fourier transform (DFT), and the channel model $\theta(k)$ includes channel model coefficients (parameters) in the time-delay domain. For the sake of this discussion, it is assumed that the channel model $\theta(k)$ is m-sparse. That is, the channel model $\theta(k)$ contains no more than m non-zero components, where m<<d.

According to at least one example embodiment, the transmitted pilots $\Lambda_p$ are received as an over-the-air radio-frequency (RF) signal at the receiver 20. At the receiver 20, the receiver processing block 202 processes the received RF signal to obtain the raw channel estimates $y_k$ for each of the K antennas ANT20-1 through ANT20-K. In more detail, the receiver processing block 202 down-converts the RF signal, and then performs timing and frequency adjustment on the baseband signal to obtain the received signals $y_p(k)$ for each of the K antennas ANT20-1 through ANT20-K. The receiver processing block 202 then generates the raw channel estimates y(k) for each of K antennas ANT20-1 through ANT20-K based on the received signals $y_p(k)$ and the known transmitted pilots $\Lambda_p$. In one example, the receiver processing block 202 generates the raw channel estimates y(k) according to Equation (3) discussed above; that is, by dividing the received signals $y_p(k)$ by the known transmitted pilots $\Lambda_p$.

The receiver processing block 202 outputs the raw channel estimates y(k) for each of the K receive antennas ANT20-1 through ANT20-K to the channel estimation block 204 in the form of an N×$N_a$ matrix of raw channel estimates. The N×$N_a$ matrix of raw channel estimates can also be described as a N×K matrix of raw channel estimates. In this regard, $N_a$ represents the number of sources of pilots, and corresponds to the number of receive antennas K at the receiver 20. As before, N represents the number of pilots from each source. For the sake of this discussion, the N×$N_a$ matrix of raw channel estimates may be referred to as raw channel estimation matrix Y.

The channel estimation block 204 generates the channel model $\theta(k)$ in the m-sparse domain based on the raw channel estimates y(k) from the receiver processing block 202. Generation of the channel model $\theta(k)$ at the channel estimation block 204 will be described in more detail later with regard to FIG. 2. The channel estimation block 204 then recovers the final estimated channel (or channel estimates) CH_EST by combining the channel model $\theta(k)$ with the measurement matrix H according to Equation (4) shown below.

$$CH\_EST(k) = H\theta(k) \quad (4)$$

The channel estimation block 204 then outputs the final estimated channel CH_EST to the demodulation block 206.

The demodulation block 206 recovers the transmitted data based on (using) the final estimated channel CH_EST from the channel estimation block 204 and the received signal $y_p(k)$ from the receiver processing block 202. As is known, and exemplified by Equation (2), to recover the transmitted data the demodulation block 206 divides the received symbols by the final estimated channel CH_EST, and then recovers the original transmitted data bits.

Figure 2:
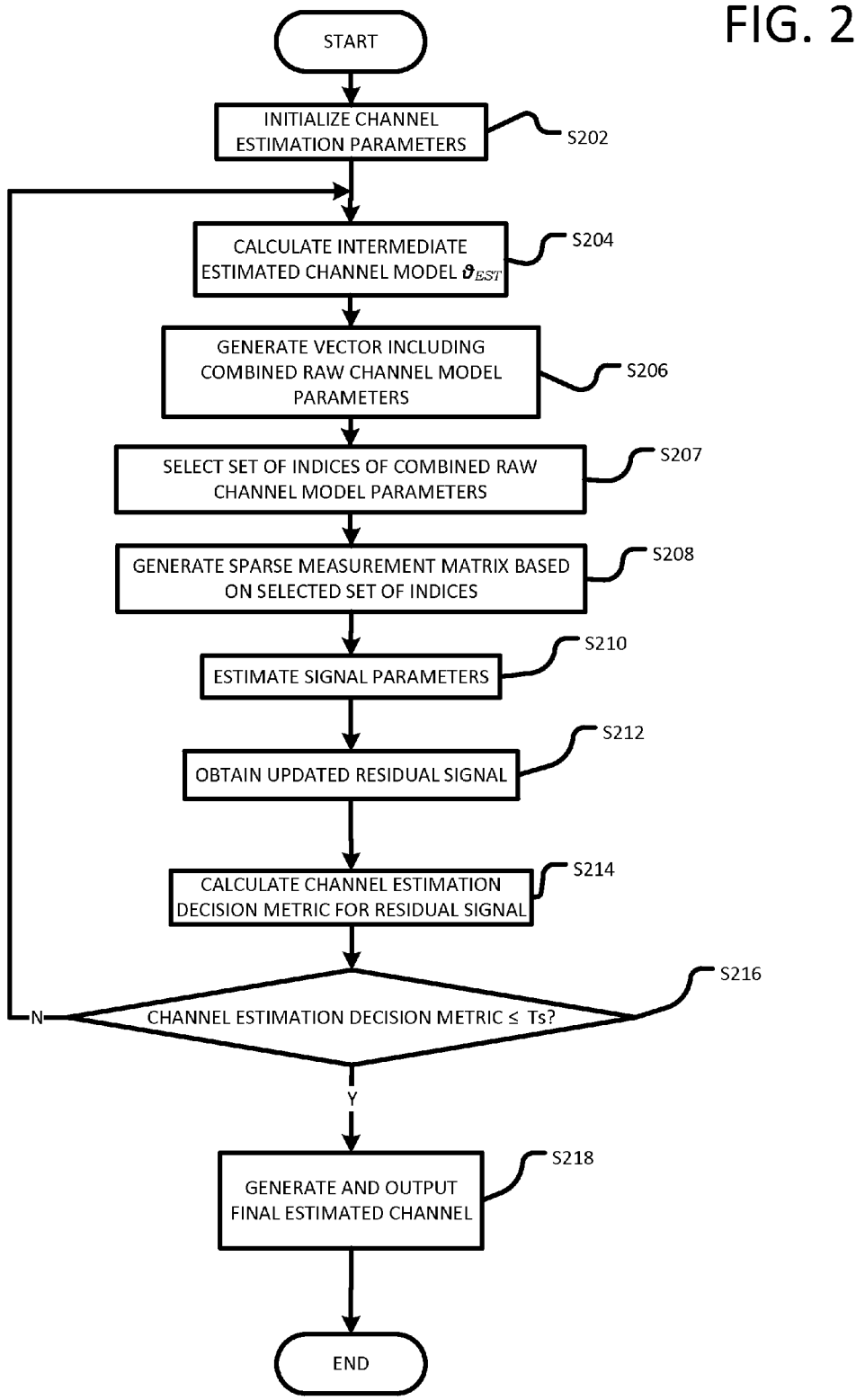
FIG. 2 is a flow chart illustrating a method for channel estimation according to an example embodiment.

FIG. 2 is a flow chart illustrating an example embodiment of a method for channel estimation at a receiver. For the sake of clarity, the method shown in FIG. 2 will be described with regard to the receiver 20 shown in FIG. 1. In describing FIG. 2, an example embodiment of a method for generating the channel model $\theta(k)$ will be described in more detail.

For the sake of this discussion, it is assumed that the channel estimation block 204 operates on the N×$N_a$ (or N×K) raw channel estimation matrix Y output from the receiver processing block 202, and it is assumed that the underlying channel model $\theta(k)$ is m-sparse.

Referring to FIG. 2, at step S202 the channel estimation block 204 initializes a plurality of channel estimation parameters. In one example, the channel estimation block 204 initializes a set S of indices taken from {1,d}, where d is the number of subcarriers in the system. In so doing, the channel estimation block 204 clears the set S. The channel estimation block 204 also sets a residual signal r equal to the received (or observed) signal received (or observed) at the receiver 20. In this case, the received signal at each antenna is represented by the raw channel estimation matrix Y.

At step S204, the channel estimation block 204 calculates an intermediate estimated channel model $\theta_{EST}$ based on the known N×d measurement matrix H and the residual signal r. As mentioned above, in this initial iteration the residual signal r is set equal to the N×$N_a$ matrix of raw channel estimates y(k) (raw channel estimation matrix Y) from the receiver processing block 202. More specifically, the channel estimation block 204 calculates raw or temporary (intermediate) channel model parameters, denoted here as $\theta_{EST}$, according to Equation (5) shown below. As discussed herein, these raw or temporary (intermediate) channel model parameters may also be referred to as intermediate raw channel model parameters, intermediate channel model parameters, channel model parameters, or raw estimates of the channel model.

$$\theta_{EST}=H^*r \tag{5}$$

In Equation (5), H* is the conjugate or transpose of the measurement matrix H discussed above.

At step S206, the channel estimation block 204 combines the magnitudes in each of d×1 sets of $N_a$ sources (antennas) to generate a d×1 vector including combined raw channel model parameters of the intermediate estimated channel model $\theta_{EST}$.

In more detail, the channel estimation block 204 combines across columns of the intermediate channel model $\theta_{EST}$ to generate a d×1 matrix of combined magnitudes (also sometimes referred to herein as combined raw channel model matrix $\theta_{EST\_COMB}$). The combining operation may be simple addition or a power sum where the magnitudes in each column are squared before being added. If not already squared, the combined magnitudes in the d×1 matrix $\theta_{EST\_COMB}$ are squared after being combined.

At step S207, the channel estimation block 204 selects indices of the combined raw channel model parameters in the combined raw channel model $\theta_{EST\_COMB}$ based on the magnitudes of the combined raw channel model parameters and a combined raw channel model parameter threshold value T. In this regard, the channel estimation block 204 compares the magnitudes of the d combined raw channel model parameters in the combined raw channel model $\theta_{EST\_COMB}$ with the combined raw channel model parameter threshold value T, and selects indices corresponding to those combined raw channel model parameters having magnitudes greater than or equal to the combined raw channel model parameter threshold value T. The selected indices are then added to the set S.

As discussed herein, the combined raw channel model parameter threshold value T may also be referred to as a combined channel model parameter threshold value or the combined channel model threshold. Moreover, the combined raw channel model parameters having magnitudes greater than or equal to the combined raw channel model parameter threshold value T may also be referred to as passing or above the combined raw channel model parameter threshold. By contrast, the combined raw channel model parameters having magnitudes less than the combined raw channel model parameter threshold value are said to fall below the combined raw channel model parameter threshold.

The combined raw channel model parameter threshold value T may be selected (e.g., by a network operator, etc.) to obtain a given, desired or predetermined relatively low false alarm probability. In one example, the combined raw channel model parameter threshold value T may be selected using single-sided hypothesis testing and based on an estimated noise variance of the magnitudes of the combined raw channel model parameters. Because methods for estimating noise variance are well-known, a detailed discussion is omitted.

Returning to step S207, in another example the channel estimation block 204 filters the set of indices of the combined raw channel model parameters in the combined raw channel model matrix $\theta_{EST\_COMB}$ based on the combined raw channel model parameter threshold value T to obtain the indices to be added to the set S. In this example, the channel estimation block 204 disregards or filters out indices corresponding to the combined raw channel model parameters having magnitudes less than the combined raw channel model parameter threshold value T.

At step S208, the channel estimation block 204 generates a sparse measurement matrix H(s) of dimension N×d, whose non zero columns are taken from H according to the set S of indices. In one example, the channel estimation block 204 selects values from the measurement matrix H corresponding to the indices in the set S to generate the sparse measurement matrix H(s). The sparse measurement matrix H(s) is a vector corresponding to a partial model of the residual signal r. The residual signal r further includes signal and noise components to be modeled. More specifically, the channel estimation block 204 selects columns of the measurement matrix H corresponding to the indices in the set S to generate the sparse measurement matrix H(s).

At step S210, the channel estimation block 204 estimates signal parameters $\hat{\theta}$ for the residual signal r in the m-sparse domain based on the sparse measurement matrix H(s). The channel estimation block 204 may estimate the signal parameters $\hat{\theta}$ in any well-known manner. In one example, the channel estimation block 204 estimates the signal parameters using a least squares (LS) estimation algorithm. Because algorithms such as these are well-known, a detailed discussion is omitted.

At step S212, the channel estimation block 204 obtains an updated residual signal $r_{UPDATE}$ based on the estimated signal parameters $\hat{\theta}$, Y, and the sparse measurement matrix H(s). In more detail, the channel estimation block 204 obtains the updated residual signal $r_{UPDATE}$ according to Equation (6) shown below.

$$r_{UPDATE}=Y-H(s)\hat{\theta} \tag{6}$$

At step S214, the channel estimation block 204 calculates a channel estimation decision metric for the updated residual signal $r_{UPDATE}$. In one example, the channel estimation decision metric is the $l_1$ norm of the updated residual signal $r_{UPDATE}$. The channel estimation block 204 may calculate the $l_1$ norm of the updated residual signal $r_{UPDATE}$ by summing the absolute values of the columns of the updated residual signal $r_{UPDATE}$.

At step S216, the channel estimation block 204 compares the channel estimation decision metric (e.g., $l_1$ norm) for the updated residue signal $r_{UPDATE}$ with a channel estimation decision threshold value Ts. In one example, the channel estimation decision threshold value Ts may be set by a network operator or the like as a function of the actual signal-to-noise ratio (SNR) of the system. As discussed herein, the channel estimation decision threshold value Ts may also be referred to as the channel estimation decision threshold.

If the calculated channel estimation decision metric (e.g., $l_1$ norm) for the updated residue signal $r_{UPDATE}$ is greater than the channel estimation decision threshold value Ts at step S216, then the channel estimation block 204 returns to step S204 and continues as discussed above, except that the residual signal r is set to the updated residual signal $r_{UPDATE}$.

Returning to step S216, if the calculated channel estimation decision metric (e.g., $l_1$ norm of) for the updated residue signal $r_{UPDATE}$ is less than or equal to the channel estimation decision threshold value Ts, then the channel estimation block 204 generates the final estimated channel CH_EST(k) at step S218 by using the signal parameters $\hat{\theta}$ calculated at step S210 as the channel model $\theta(k)$ in Equation (4).

Also at step S218, the channel estimation block 204 outputs the final estimated channel CH_EST(k) to the demodulation block S206.

As mentioned above, the demodulation block 206 then recovers the transmitted data based on the final estimated channel CH_EST(k) from the channel estimation block 204 and the processed signals $y_p(k)$ from the receiver processing block 202.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for recovering transmitted data at a receiver in a wireless communications network, the method comprising:
   obtaining, at a receiving processor, channel model parameters for a received signal based on raw channel estimates for the received signal, each raw channel estimate corresponding to an antenna at the receiver;
   combining the channel model parameters to generate a combined channel model matrix including a first plurality of combined channel model parameters, each of the first plurality of combined channel model parameters being associated with a corresponding index from among a plurality of indices;
   choosing a first set of indices from among the plurality of indices, the first set of indices including indices corresponding to combined channel model parameters from among the first plurality of combined channel model parameters having magnitudes passing a combined channel model parameter threshold;
   estimating a channel in a sparse domain based on the combined channel model parameters corresponding to the indices in the first set of indices, the estimated channel in the sparse domain having less than m non-zero components, wherein m is less than a number of subcarriers in the wireless communications network; and
   recovering the transmitted data based on the estimated channel.

2. The method of claim 1, wherein the estimating step further comprises:
   computing a sparse measurement matrix based on the combined channel model parameters corresponding to the indices in the first set of indices; and
   estimating the channel based on the sparse measurement matrix.

3. The method of claim 2, wherein the sparse measurement matrix includes values selected from a channel measurement matrix, the computing step further including,
   selecting, from the channel measurement matrix, values corresponding to indices in the first set of indices as values of the sparse measurement matrix.

4. The method of claim 1, wherein the estimating step further comprises:
   generating a sparse measurement matrix based on the combined channel model parameters corresponding to the indices in the first set of indices;
   calculating estimated signal parameters associated with the received signal based on the sparse measurement matrix; and
   estimating the channel based on the estimated signal parameters.

5. The method of claim 1, wherein the channel model parameters are in the form of a channel model parameter matrix including magnitudes of raw channel model parameters for the received signal, and the combining step includes,
   combining magnitudes of the raw channel model parameters to obtain the combined channel model matrix.

6. The method of claim 1, wherein the estimating the channel in the sparse domain further comprises:
   generating a residual signal value based on estimated signal parameters;
   calculating a channel estimation decision metric based on the residual signal value;
   comparing the channel estimation decision metric with a channel estimation decision threshold; and
   estimating the channel in the sparse domain based on the sparse measurement matrix if the channel estimation decision metric passes the channel estimation decision threshold.

7. The method of claim 1, wherein the estimating step comprises:
   iteratively obtaining a sparse measurement matrix based on the combined channel model parameters corresponding to the indices in the first set of indices; and
   estimating the channel in the sparse domain based on the iteratively obtained sparse measurement matrix.

8. The method of claim 1, wherein the choosing step comprises:
   comparing each of the plurality of combined channel model parameters with the combined channel model parameter threshold; and
   choosing the first set of indices based on the comparing step.

9. The method of claim 1, wherein the choosing step comprises:
   filtering indices corresponding to the first plurality of combined channel model parameters based on the combined channel model parameter threshold; and
   choosing the first set of indices based on the filtering step.

10. A method for recovering transmitted data at a receiver in a wireless communications network, the method comprising:
    obtaining, at a receiving processor, channel model parameters for a received signal based on raw channel estimates for the received signal, each raw channel estimate corresponding to an antenna at the receiver;
    combining the channel model parameters to generate a combined channel model matrix including a first plurality of combined channel model parameters;
    choosing a first set of combined channel model parameters from among the first plurality of combined channel model parameters based on magnitudes of the first plurality of combined channel model parameters and a combined channel model parameter threshold; and estimating a channel in a sparse domain based on the combined channel model parameters in the first set of combined channel model parameters, the estimated channel in the sparse domain having less than m non-zero components, wherein m is less than a number of subcarriers in the wireless communications network; and recovering transmitted data based on the estimated channel.

11. The method of claim 10, wherein the estimating step further comprises:

computing a sparse measurement matrix based on the combined channel model parameters in the first set of combined channel model parameters; and estimating the channel based on the sparse measurement matrix.

12. The method of claim 11, wherein the sparse measurement matrix includes values selected from a measurement matrix, the computing step further including, selecting, from the measurement matrix, values corresponding to the indices as values of the sparse measurement matrix.

13. The method of claim 10, wherein the channel model parameters are in the form of a channel model parameter matrix including magnitudes of raw channel model parameters for the received signal, and the combining step includes, combining magnitudes of the raw channel model parameters to obtain the combined channel model matrix.

14. A receiver to receive wireless communications in a wireless communications network, the receiver comprising:

a receiving processor configured to obtain channel model parameters for a received signal based on raw channel estimates for the received signal, each raw channel estimate corresponding to an antenna at the receiver;

a channel estimation processor configured to, combine the channel model parameters to generate a combined channel model matrix including a first plurality of combined channel model parameters, each of the first plurality of combined channel model parameters being associated with a corresponding index from among a plurality of indices, choose a first set of indices from among the plurality of indices, the first set of indices including indices corresponding to combined channel model parameters from among the first plurality of combined channel model parameters having magnitudes passing a combined channel model parameter threshold, and estimate a channel in a sparse domain based on the combined channel model parameters corresponding to the indices in the first set of indices, the estimated channel in the sparse domain having less than m non-zero components, wherein m is less than a number of subcarriers in the wireless communications network; and a demodulation processor configured to recover transmitted data based on the estimated channel.

15. The receiver of claim 14, wherein the channel estimation processor is further configured to, compute a sparse measurement matrix based on the combined channel model parameters corresponding to the indices in the first set of indices, and estimate the channel based on the sparse measurement matrix.

16. The receiver of claim 15, wherein the sparse measurement matrix includes values selected from a channel measurement matrix, and the channel estimation processor is further configured to, select, from the channel measurement matrix, values corresponding to indices in the first set of indices to compute the sparse measurement matrix.

* * * * *